United States Patent
Adam et al.

(10) Patent No.: US 9,940,466 B2
(45) Date of Patent: *Apr. 10, 2018

(54) COMPUTER-IMPLEMENTED COMMAND CONTROL IN INFORMATION TECHNOLOGY SERVICE ENVIRONMENT

(71) Applicant: International Business Machines Corporation, Armonk, NY (US)

(72) Inventors: Constantin M. Adam, Norwalk, CT (US); Nikolaos Anerousis, Chappaqua, NY (US); Vysakh K. Chandran, Thrissur (IN); Milton H. Hernandez, Tenafly, NJ (US); Debasisha K. Padhi, Bangalore (IN); Yaoping Ruan, White Plains, NY (US); Fabio M. Tanada, Campinas (BR); Frederick Y.-F. Wu, Greenwich, CT (US); Sai Zeng, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/371,392

(22) Filed: Dec. 7, 2016

(65) Prior Publication Data
US 2017/0177878 A1  Jun. 22, 2017

Related U.S. Application Data

(63) Continuation of application No. 14/978,291, filed on Dec. 22, 2015, now Pat. No. 9,584,378.

(51) Int. Cl.
*G06F 21/57* (2013.01)
*H04L 29/08* (2006.01)
*H04L 29/06* (2006.01)

(52) U.S. Cl.
CPC ............ *G06F 21/577* (2013.01); *H04L 67/30* (2013.01); *H04L 67/42* (2013.01); *G06F 2221/034* (2013.01)

(58) Field of Classification Search
None
See application file for complete search history.

(56) References Cited

U.S. PATENT DOCUMENTS 6,078,653 A * 6/2000 Jean-Claude ....... H04M 1/0291
379/162
7,243,200 B2  7/2007 Day et al.
(Continued)

FOREIGN PATENT DOCUMENTS

WO  WO2013110857 A1  8/2013

OTHER PUBLICATIONS

List of IBM Patents or Patent Applications Treated as Related, dated Dec. 7, 2016, 2 pages.

*Primary Examiner* — Ninos Donabed
(74) *Attorney, Agent, or Firm* — Scully, Scott, Murphy & Presser, P.C.; Louis J. Percello, Esq.

(57) ABSTRACT

A computer-implemented agent process running on a first computer automatically intercepts a command issued from the first computer to execute on a target computer prior to invocation of the command on the target computer. A server profile built for an application running on the target computer that supports the command may be retrieved. At least based on the server profile a risk enforcement policy is dynamically constructed. Based on the risk enforcement policy, one or more computer-executable enforcement actions to perform prior to sending the command to the target computer for execution is determined. Based on executing of one or more of the computer-executable enforcement actions, the command may be transmitted to
(Continued)

execute on the target computer or prevented from executing on the target computer.

14 Claims, 7 Drawing Sheets

(56) References Cited

U.S. PATENT DOCUMENTS

| | | | |
|---|---|---|---|
| 7,433,877 B2 * | 10/2008 | Chen | G06F 17/30448 |
| 7,512,988 B2 | 3/2009 | Miyamoto et al. | |
| 7,620,775 B1 | 11/2009 | Waxman | |
| 7,739,731 B2 | 6/2010 | Violleau et al. | |
| 7,770,059 B1 | 8/2010 | Glade et al. | |
| 7,797,727 B1 | 9/2010 | Miller et al. | |
| 7,904,605 B2 | 3/2011 | Yudenfriend et al. | |
| 8,296,383 B2 | 10/2012 | Lindahl | |
| 8,374,887 B1 | 2/2013 | Alexander | |
| 8,544,003 B1 | 9/2013 | Sawhney et al. | |
| 8,589,495 B1 | 11/2013 | Beckert | |
| 8,667,589 B1 * | 3/2014 | Saprygin | H04L 63/0209 726/23 |
| 8,823,793 B2 | 9/2014 | Clayton et al. | |
| 9,665,718 B2 | 5/2017 | Anderson et al. | |
| 2002/0124100 A1 | 9/2002 | Adams | |
| 2002/0133585 A1 | 9/2002 | Deming | |
| 2003/0140090 A1 | 7/2003 | Rezvani et al. | |
| 2003/0140121 A1 | 7/2003 | Adams | |
| 2003/0212789 A1 | 11/2003 | Hamel et al. | |
| 2003/0233544 A1 | 12/2003 | Erlingsson | |
| 2004/0006706 A1 | 1/2004 | Erlingsson | |
| 2004/0010724 A1 | 1/2004 | Brown et al. | |
| 2004/0044516 A1 | 3/2004 | Kennewick et al. | |
| 2004/0059797 A1 | 3/2004 | Velan et al. | |
| 2005/0055577 A1 * | 3/2005 | Wesemann | H04L 63/0272 726/4 |
| 2005/0060654 A1 | 3/2005 | DeLuca et al. | |
| 2005/0102351 A1 | 5/2005 | Jiang et al. | |
| 2005/0149726 A1 | 7/2005 | Joshi et al. | |
| 2007/0050369 A1 | 3/2007 | Stiegler et al. | |
| 2007/0245409 A1 * | 10/2007 | Harris | H04L 63/0272 726/5 |
| 2008/0098006 A1 | 4/2008 | Pedersen et al. | |
| 2008/0313269 A1 | 12/2008 | Schmieder et al. | |
| 2009/0066641 A1 | 3/2009 | Mahajan et al. | |
| 2009/0228316 A1 | 9/2009 | Foley et al. | |
| 2010/0037296 A1 * | 2/2010 | Silverstone | G06F 21/53 726/3 |
| 2010/0057836 A1 | 3/2010 | Anbuselvan | |
| 2010/0106767 A1 | 4/2010 | Livshits et al. | |
| 2010/0175104 A1 | 7/2010 | Khalid | |
| 2010/0211653 A1 | 8/2010 | Creemer et al. | |
| 2011/0030045 A1 | 2/2011 | Beauregard et al. | |
| 2011/0119290 A1 * | 5/2011 | Dhoble | G06F 19/322 707/769 |
| 2011/0187811 A1 * | 8/2011 | Kim | H04N 5/225 348/14.01 |
| 2011/0225271 A1 | 9/2011 | Seymour | |
| 2012/0066499 A1 | 3/2012 | Ali et al. | |
| 2012/0096120 A1 | 4/2012 | Couillabin et al. | |
| 2012/0320013 A1 | 12/2012 | Perez et al. | |
| 2013/0111547 A1 * | 5/2013 | Kraemer | G06F 21/552 726/1 |
| 2013/0298120 A1 | 11/2013 | Durham et al. | |
| 2013/0305348 A1 * | 11/2013 | Silverstone | G06F 21/53 726/16 |
| 2014/0123160 A1 | 5/2014 | van Coppenolle et al. | |
| 2014/0123161 A1 | 5/2014 | van Coppenolle et al. | |
| 2014/0123260 A1 | 5/2014 | Choi et al. | |
| 2014/0163460 A1 | 6/2014 | Budiman | |
| 2014/0280879 A1 | 9/2014 | Skolicki | |
| 2015/0059002 A1 | 2/2015 | Balram et al. | |

* cited by examiner

COMPUTER-IMPLEMENTED COMMAND CONTROL IN INFORMATION TECHNOLOGY SERVICE ENVIRONMENT

CROSS-REFERENCE TO RELATED APPLICATIONS

This application is a continuation of U.S. patent application Ser. No. 14/978,291, filed Dec. 22, 2015, the entire content and disclosure of which is incorporated herein by reference.

FIELD

The present application relates generally to computers and computer applications, and more particularly to controlling computer-executable commands executing on a machine.

BACKGROUND

System maintenance including problem resolution and change implementation mainly relies on human operations. Little error prevention mechanism is available in software packages or computer operating systems (OS) when system administrators are performing manual updates or changes. Due to specific application and client requirements, enforcing controls on server side across all platforms is difficult. Auditing systems are often reactive and do not prevent incidents from happening proactively.

In information technology (IT) services environment, system administrators may perform maintenance on computer systems ranging from fixing failures, updates, changes, provisioning, and decommissioning. Most of those maintenance activities require manual input, for example, from system administrators, either using tools or native commands. While some tasks can be performed via automation tools and through graphical user interfaces, a significant number of tasks still rely on interactive command interfaces due to various reasons.

Manual process can commonly introduce operational errors since modern computer systems are rather complex, e.g., Unix OS has more than 300 commands, and each with multiple options. A mistake in the input parameters or the execution context may cause the entire system to crash and become unavailable.

BRIEF SUMMARY

A computer-implemented method and system of controlling execution of computer-executable commands may be provided. The method, in one aspect, may include intercepting, automatically by a computer-implemented agent process running on a first computer, a command issued from the first computer to execute on a target computer prior to invocation of the command on the target computer. The method may also include retrieving a server profile built for an application running on the target computer that supports the command. The method may further include dynamically constructing a risk enforcement policy at least based on the server profile and change policy. The method may also include determining based on the risk enforcement policy, one or more computer-executable enforcement actions to perform prior to sending the command to the target computer for execution. The method may further include, based on executing of one or more of the computer-executable enforcement actions, transmitting the command to execute on the target computer or preventing the command from executing on the target computer to prevent error.

A system of controlling execution of commands, in one aspect, may include one or more hardware processors. One or more of the hardware processors may be operable to intercept a command issued from a first computer to execute on a target computer prior to invocation of the command on the target computer. One or more of the hardware processors may be further operable to retrieve a server profile built for an application running on the target computer that supports the command. One or more of the hardware processors may be further operable to dynamically construct a risk enforcement policy at least based on the server profile and change policy. One or more of the hardware processors may be further operable to determine based on the risk enforcement policy, one or more computer-executable enforcement actions to perform prior to sending the command to the target computer for execution, Based on executing of one or more of the computer-executable enforcement actions, one or more of the hardware processors may be further operable to transmit the command to execute on the target computer or prevent the command from executing on the target computer to prevent error.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
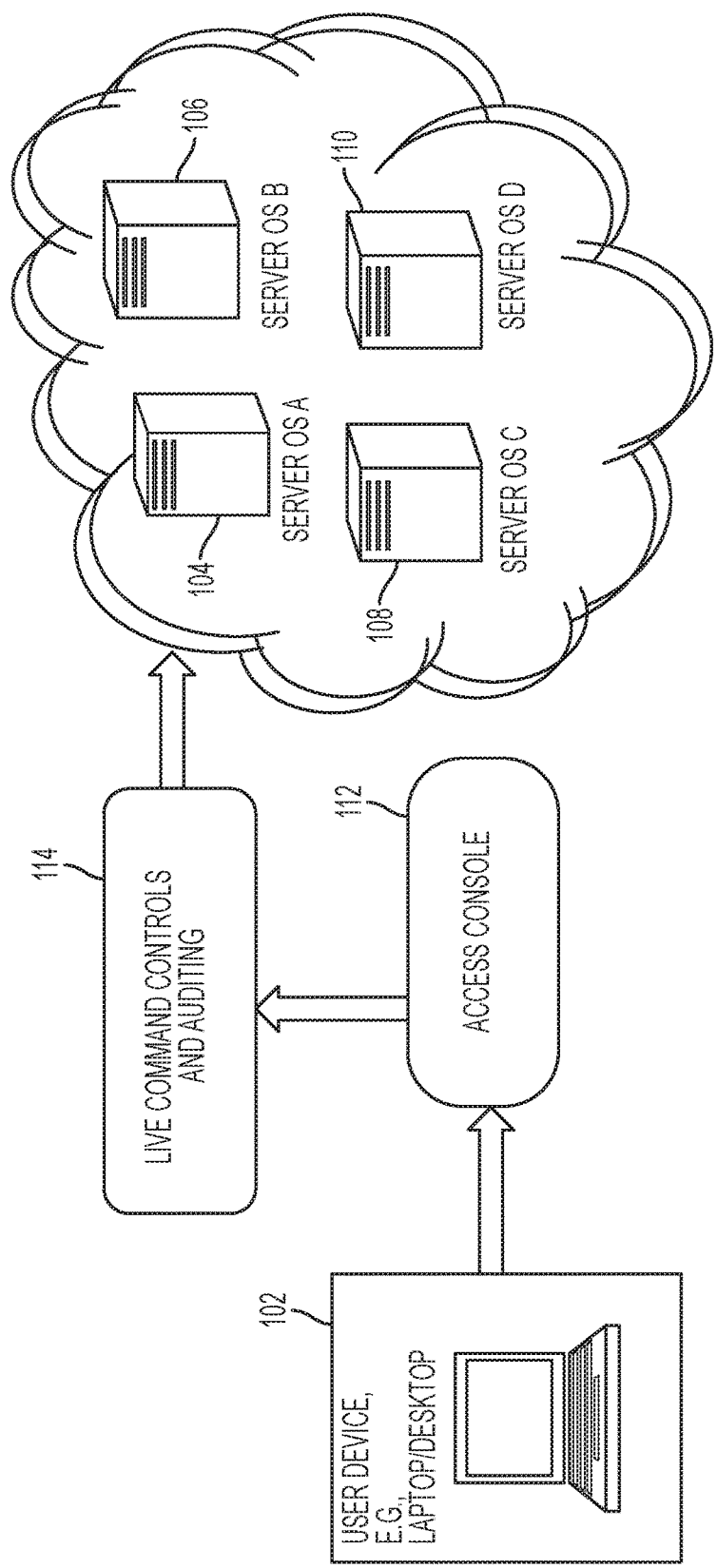
FIG. 1 is a diagram illustrating a system that controls execution of computer commands in computer systems, for example, server systems in one embodiment of the present disclosure.

A system, method and/or techniques are disclosed that implement non-intrusive live controls and auditing of server maintenance activities, for example, which minimize operational errors in computer systems. In one embodiment, control and auditing are enforced on the client side (e.g., user laptops, desktops, and/or other client-side devices). In one embodiment, no changes on the server side may be required. In one embodiment, user commands are captured before they are executed on the target machine or server based on target-specific context-aware policies. A computer-implemented or executable agent process, for example, may run on a user's or client-side device and interrogate one or more user inputs and server responses. In one embodiment, no modification to the application, for example, which an end user regularly uses to operate on one or more target devices, may be needed.

In one embodiment of a method and/or system of the present disclosure, all access to the server from the client side may be restricted, for example, by allowing only one application to connect to the managed servers. This application has the capability to intercept the user commands before they are executed on the target server, and validate them against target specific, context aware policies. For instance, a computer-implemented agent running on a computer processor intercepts commands issued by users, sends the commands to a context-aware rule engine or the like, which determines the risk level of the command, then sends the commands to the target device if it is determined to be a safe command to execute, warns the user if it is determined to be a risky command to execute, or blocks the command if it is determined to be wrong or an incorrect command.

The context-aware rule engine may include customizable static policies and dynamically constructed context. Policies may contain platform-specific user commands with different risk levels and device-specific critical resources. Context may contain a description of the current task being performed, user role definition, current working directory on the target device, and other data.

The system and method of the present disclosure in one embodiment may help prevent incidents due to human error and also may provide strong accountability, for example, by recording or logging the user identifier that issued commands on the server, the time when the commands were issued, and the reason why the activity took place.

In one embodiment, no changes are needed in the managed servers, thereby avoiding management issues associated with managed servers. The system and method of the present disclosure in one embodiment does not have any dependency of server patches and updates. In one embodiment, no server side installations need be involved, hence any server to which a system administrator or the like connects using the system and/or method of the present disclosure may be automatically entitled for live controls and audit.

Manual tasks are prone to error. In IT services, outages caused by such errors may happen during change implementation or in responding to system alerts and problems. Such outage may have significant negative impact on business applications, degrade customer satisfaction and sometime cause contractual penalty. The system and method of the present disclosure may for provide an easy-to-deploy system for services delivery which requires minimum changes to existing infrastructure but can effectively reduce operational errors. For example, the system and method of the present disclosure in one embodiment provide for a user-transparent system without changing any system management tool (user application) and without deploying extra application or software on managed endpoints. The system and method of the present disclosure in one embodiment may dynamically construct implementation policy by inheriting and multiplexing from multiple sources. The system and method of the present disclosure in one embodiment may provide for live controls and audit for system administration, for example, of server systems. The system and method of the present disclosure in one embodiment may provide for proactive validation of commands that takes place after the user has issued a command, but before it executes on the target server. In live auditing capabilities provided in the system and method of the present disclosure in one embodiment, sessions may be recorded and the log integrity can be guaranteed by using checksums. The system and method of the present disclosure may implement and/or utilize command policy rules that are customizable. For example, account leads can define different command policies, according to the level of experience of their team, the status of the target server (e.g., production versus development), the task at hand, the account, and others.

The system and/or method of the present disclosure in one embodiment may be based on dynamic analysis of privileged commands to be executed in target/host servers, for example, regardless of whether they are run in a virtual or a physical server. The system and/or method of the present disclosure in one embodiment may evaluate the content of what will be run, for example, to secure the operation and/or maintenance of servers. In one embodiment, the system and/or method of the present disclosure may provide permissions at the command level, for example, blocking or executing specific handlers for groups of commands. For instance, according to the system and/or method of the present disclosure in one embodiment, the command levels may be restricted without revoking the user permissions to access a managed server. For instance, even though the user has root permission, the user may be disallowed from executing the commands that are blocked, for example, providing the command execution warning level. The allowed commands that a user can run may be based on a set of policies. In one embodiment, the system and/or method of the present disclosure may prevent code execution that is improperly launched, for example, which cannot be determined simply by access permission. For instance, even a user with root permission level may not be able to perform all actions if the action is determined for blocking, e.g., removing a data file where the data file is registered as part of the protected resource in policy. Isolation and/or prevention may be determined by the context of the command and the semantic of the command, which may be treated as a piece of computer code or application.

The system and/or method of the present disclosure in one embodiment may allow for propagating a policy dynamically to an unlimited number of target servers. The system and/or method of the present disclosure in one embodiment may allow the users to take additional actions before deciding if a command is to be executed or not. The system and/or method of the present disclosure in one embodiment may allow for changing the restricted commands, dynamically, on a task-by-task basis. The system and/or method of the present disclosure in one embodiment may make the user aware of the effects the commands will have on a system and also may allow users to validate commands based on criterion or criteria other than the security access rights, for example, validation based on the server profile, the specific task at hand, the context in which the command is issued (e.g., a risky command in an OS environment might be necessary in a storage environment).

FIG. 1 is a diagram illustrating a system that controls execution of computer commands in computer system, for example, server systems in one embodiment of the present disclosure. An access control module executing on one or more hardware processors 112 captures computer-executable commands executed from a user device 112 (e.g., referred to also as a first computer) before they are executed on a target computer, machine or server (e.g., one or more of 104, 106, 108, 110), e.g., based on target-specific context-aware policies. Target machines or servers 104, 106, 108, 110, for example, are computer systems that are connected to the user device 102, for example, via a communication network, and for example, run application services that provide IT services or service operations to the user device 102. Live command controls and auditing module executing on one or more hardware processors 114 may receive the captured commands and determine whether the commands should be executed on one or more of the target servers 104, 106, 108 and 110, e.g., based on target-specific context-aware policies. For instance, each server 104, 106, 108, 110 may have a specific context-aware policy associated with it, and the live command controls and auditing module 114 may determine based on the specific context-aware policy whether a captured command is safe to execute, risky to execute, or should not execute, on that target machine. The access control module 112 and the live command controls and auditing module 114 may execute on the user device 102, for example, as a computer-implemented or executable agent process. In another embodiment, the access control module 112 and the live command controls and auditing module 114 may execute on one or more separate hardware processors and communicate with the user device via a computer communication network.

Figure 2:
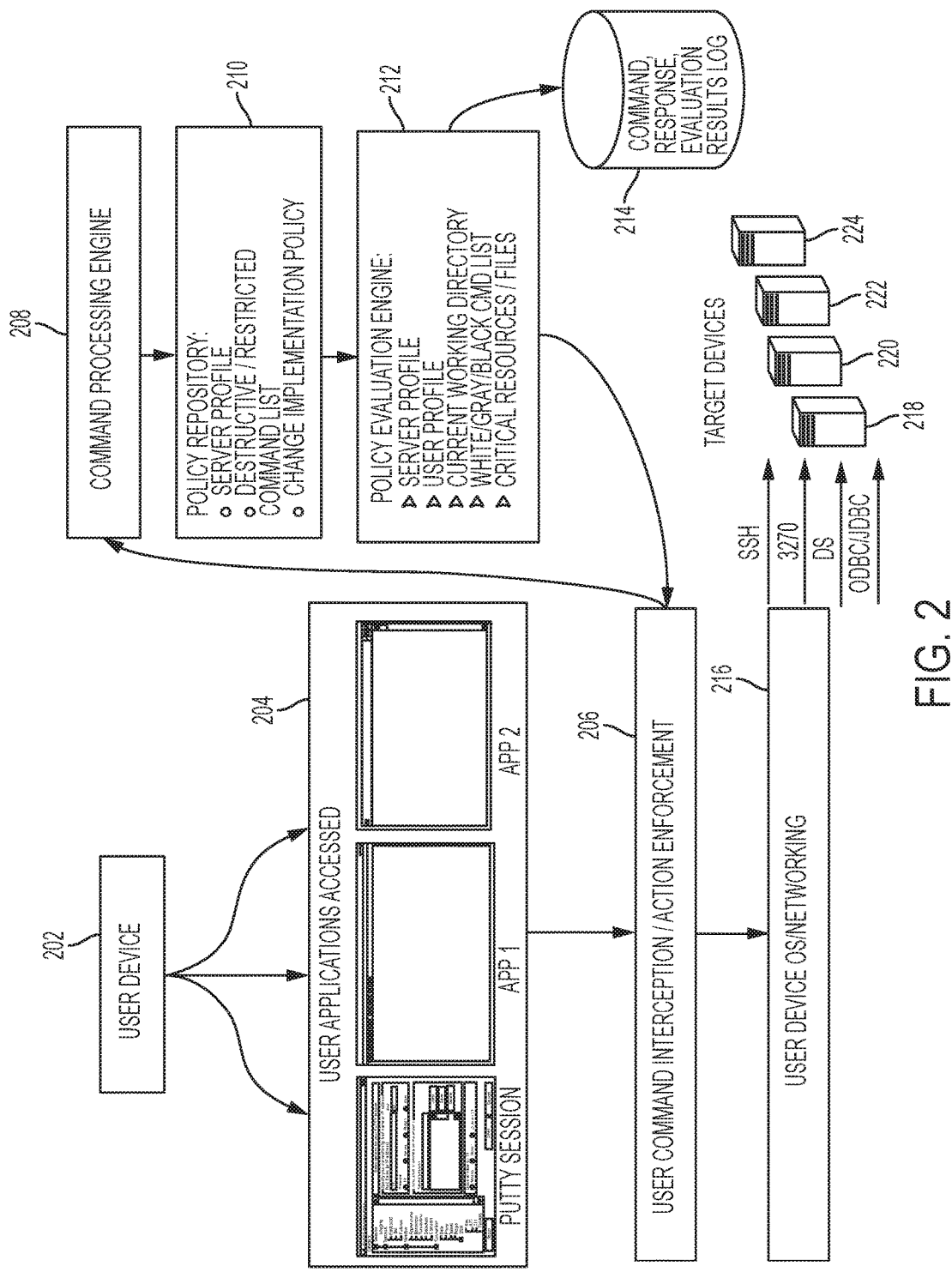
FIG. 2 is a diagram illustrating system components and their interactions in one embodiment of the present disclosure.

FIG. 2 is a diagram illustrating system components and their interactions in one embodiment of the present disclosure. A user at a user device 202 (e.g., with one or more hardware processors having circuit components) may run one or more applications 204. The commands entered on the applications may be intercepted and processed to determine enforcement actions at 206. For instance, before the command is sent to one or more target machines to execute, a command processing engine, which may run on a user device 202, determines whether the command should be restricted, for example, by looking up a policy repository 210. The policy repository 210 may include a server profile, destructive and/or restricted command list, and change implementation policy. For example, in change management systems, change is referred to, specifically, as changes to be made on target devices and/or server. Change implementation is a process where human or machine makes actions to implement changes. Change implementation policy specifies what should be changed and what should not be changed in a target device or server. A repository that stores change implementation policies may be located on a centralized server. Policies may be downloaded and/or synchronized from the repository to a user device that may enforce the policies. A policy evaluation engine 212, which may run on a user device 202, determines whether the command should be restricted based on a plurality of criteria, for example, the server profile, user profile, current working directory, risk level of the command (e.g., high/medium/low risk) and critical resources and/or files. The policy evaluation engine 212 logs or records the command in a results repository 214, e.g., a storage device. Responsive to determining that that command is safe to execute on a target machine, e.g., based on the results from the policy evaluation engine 212, the user device (e.g., its operating system and networking modules 216) sends the command to one or more target devices, e.g., 218, 220, 222, 224.

In one embodiment, if the command is determined to be not safe to execute, the user device 202 may present a warning or notification message on a display device associated with the user device 202, via a graphical user interface, and also allow the user to override the determination.

Figure 3:
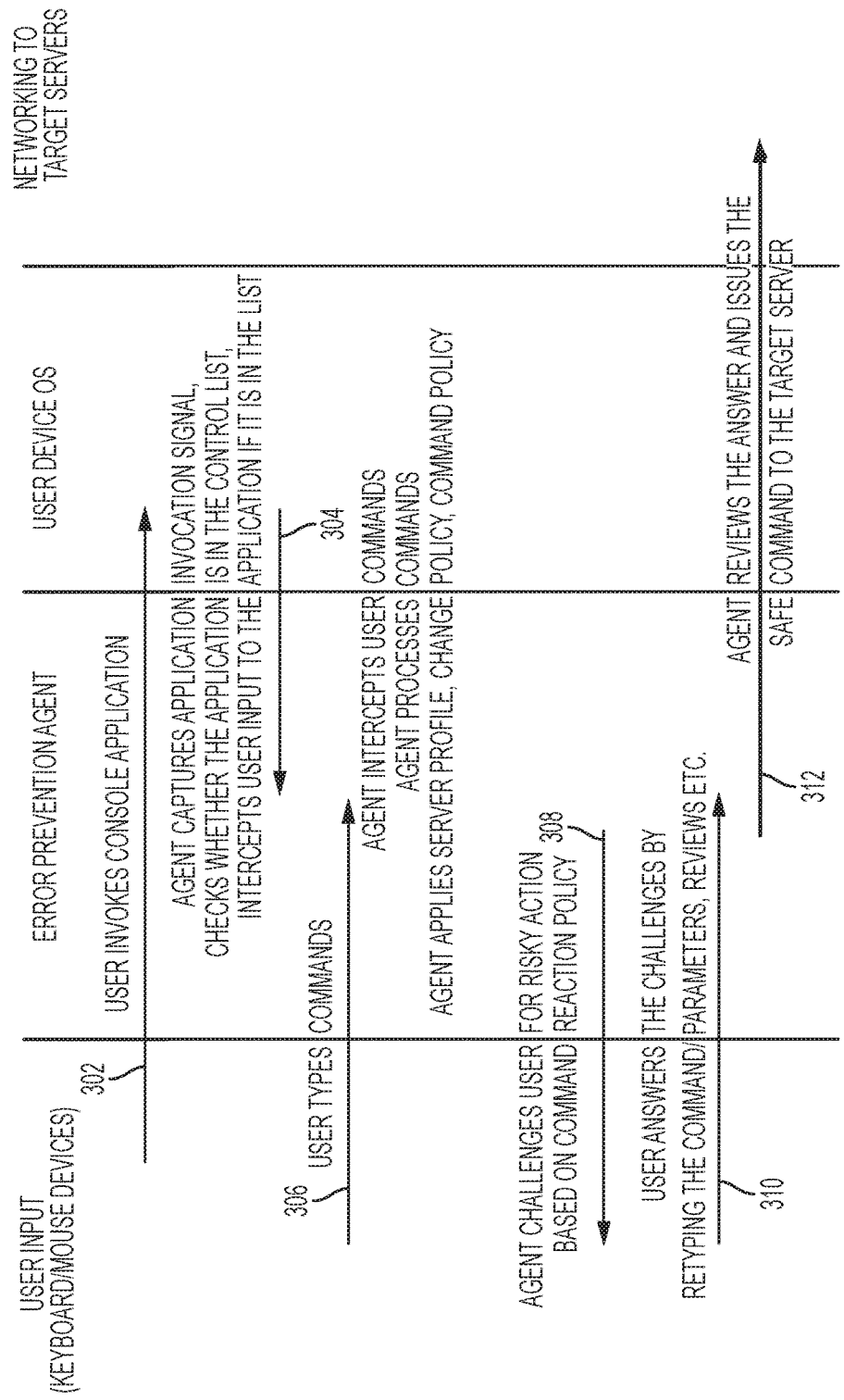
FIG. 3 is a flow diagram illustrating a method in one embodiment of the present disclosure.

FIG. 3 is a flow diagram illustrating a method in one embodiment of the present disclosure. At 302, a user via a user device and input device such as keyboard and/or mouse device, invokes a console application. At 304, a computer-implemented agent process, e.g., running on the user device, captures an application invocation signal, checks whether the application is listed in a control list, and intercepts user input to the application if it is in the list. At 306, user types one or more commands, and the computer-implemented agent process intercepts the user commands, processes the commands. The computer-implemented agent process applies server profile, change policy, and command policy and determines whether the command is safe to execute on a target server. If the command is determined to be safe, the command is sent to the target server to execute, e.g., via a network. At 308, responsive to determining that the command is not safe, the computer-implemented agent process notifies the user, e.g., by displaying on a user interface on a user device, the risk of executing the action on a target server or machine. At 310, user answer to the notification is received. For example, the user may retype the command parameters. At 312, the computer-implemented agent process reviews the answer and issues the command determined to be safe to a target server.

Figure 4:
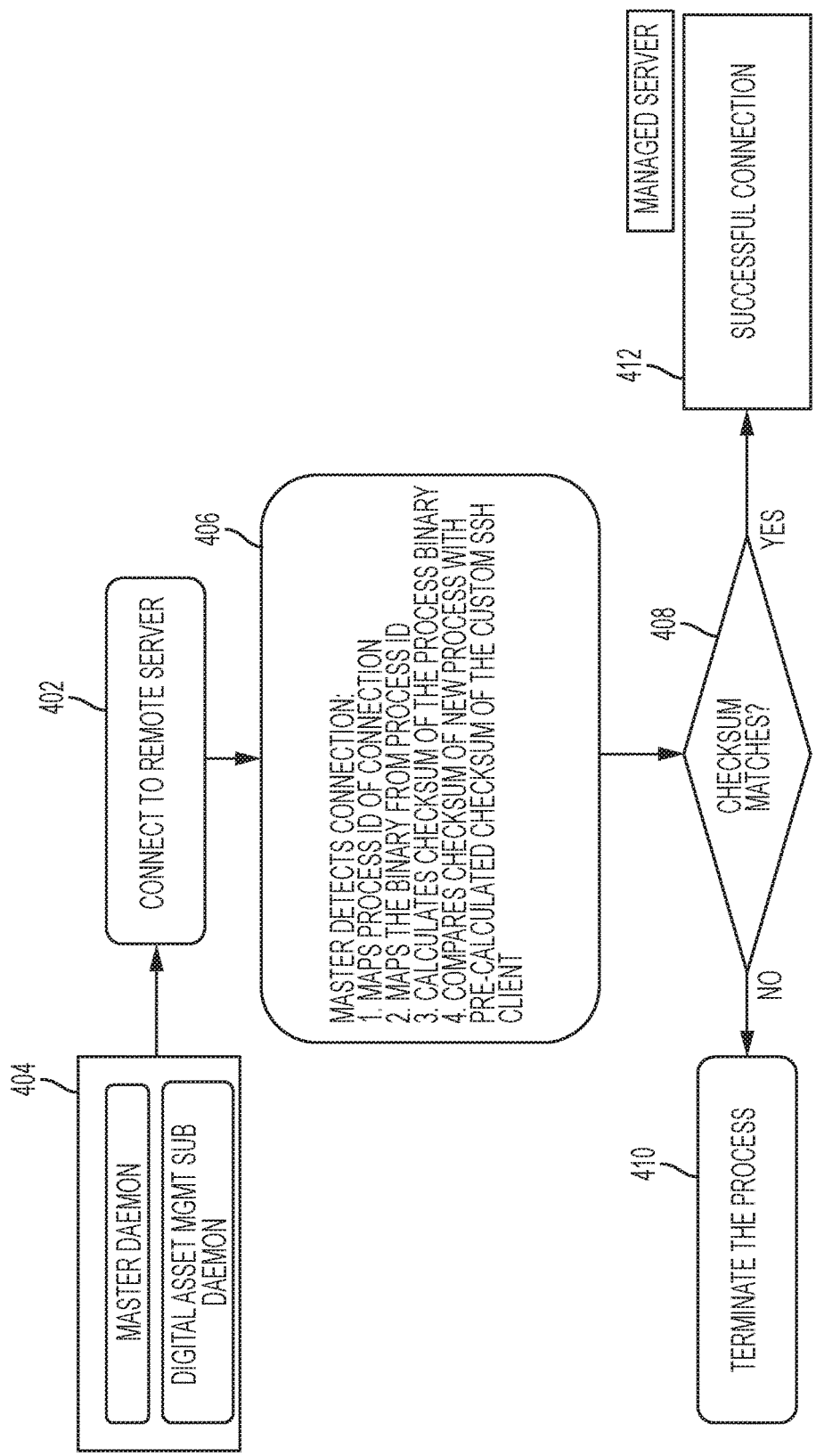
FIG. 4 is a flow diagram illustrating a method of ensuring authenticity of a user connecting to a server or device in one embodiment of the present disclosure.

FIG. 4 is a flow diagram illustrating a method of ensuring authenticity of a user connecting to a server or device in one embodiment of the present disclosure. The method shown in FIG. 4 ensures that only the users with proper error prevention mechanisms can connect to a server or device. At 402, connection to a remote server may be detected, for example, by a daemon process 404. At 406, a master daemon process maps process identifier (ID) of connection, maps the binary from the process ID, computes checksum of the process binary, and compares checksum of new process with pre-computed checksum of a custom secure shell (ssh) client.

At 408, it is determined whether the checksum matches. If the checksum does not match, the process having the process ID is terminated at 410. If the checksum matches, at 412, a connection to a target server is successfully performed. The authentication process performed in FIG. 4 verifies that an application which is executed for connecting to a target server or device is one that is authorized to do so, for example, by making sure that its checksum matches one that has been pre-approved.

Figure 5:
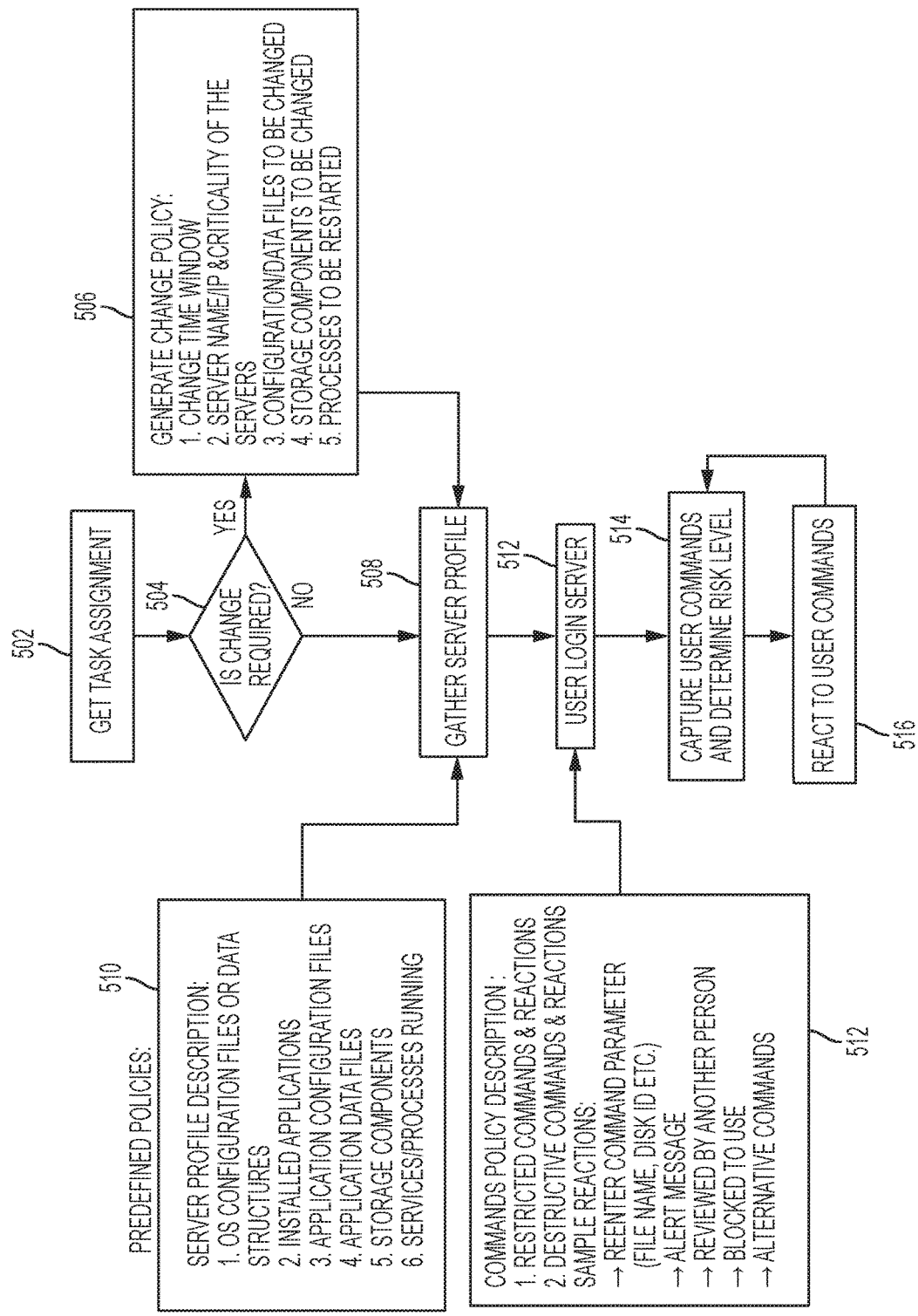
FIG. 5 is a flow diagram illustrating a method of enforcing policy in one embodiment of the present disclosure.

FIG. 5 is a flow diagram illustrating a method of enforcing a policy in one embodiment of the present disclosure. In one embodiment, the method may be executed at a user or local device accessing a remote server or device. At 502, task assignment may be gathered, for example, to start or initiate access to a server or device needing change or modification.

At 504, it is determined as to whether a change is required. A change is required, for example, if a user of a system has requested that a service provider of the system change one or more of the system configuration.

At 506, if change is required, a change policy is retrieved that defines one or more change policies, for example, change time window (time during which changes can be made), server name and/or internet protocol (IP) address, criticality of the servers, configuration and/or data files, storage components, restart one or more processes, and/or others. Change policy may generically be captured in a change management system. The method then proceeds to 508.

If at 504, it is determined that a change is not required the method proceeds to 508. It may be determined that a change is not required if there is no explicit request from a user. Rather, changes may be performed as an automatic system process, for instance, responsive to detecting an anomaly, or for example, responsive to system maintenance procedures, or the like. At 508, server profile is gathered, for example, from predefined policies 510. In one embodiment, the predefined policies 510 may be stored in an asset and configuration database or the like. Predefined policies 510 may include OS configuration files or data structures, installed applications, application configuration files, application data files, storage components, services/processes running, and/or others. The gathered data at 508 may be used to perform context-aware assessment of the commands to be executed.

At 512, user login to a server may be detected. Responsive to detecting a user login to a server, commands policy description 512 associated with that server may be received or retrieved. Command policy description 512, for example, may have been defined by subject matter experts (SMEs) and/or for example, based on industry best practices, and stored in a repository or database. Commands policy description 512 may include restricted commands and reactions, destructive commands and reactions. Example reactions may include requesting to reentering command parameters (e.g., file names, disk identifier or identification (ID), and/or others), notification or message alert, requesting another user to review the command, blocking the use of the command, providing alternate commands. The user device, for example, activates those reactions.

At 514, one or more user commands are captured and the risk level of the captured user command is determined. The risk level may be determined based on the commands policy description and/or the gathered server profile 510. For instance, using information gathered, a risk level of a command that writes or deletes configuration and data files, or system settings, may be set to high; a risk level of a command that writes or deletes a common file may be set to medium; a risk level of a command that reads a file may be set to low. At 516, one or more reactions associated with the captured user command are activated.

Figure 6:
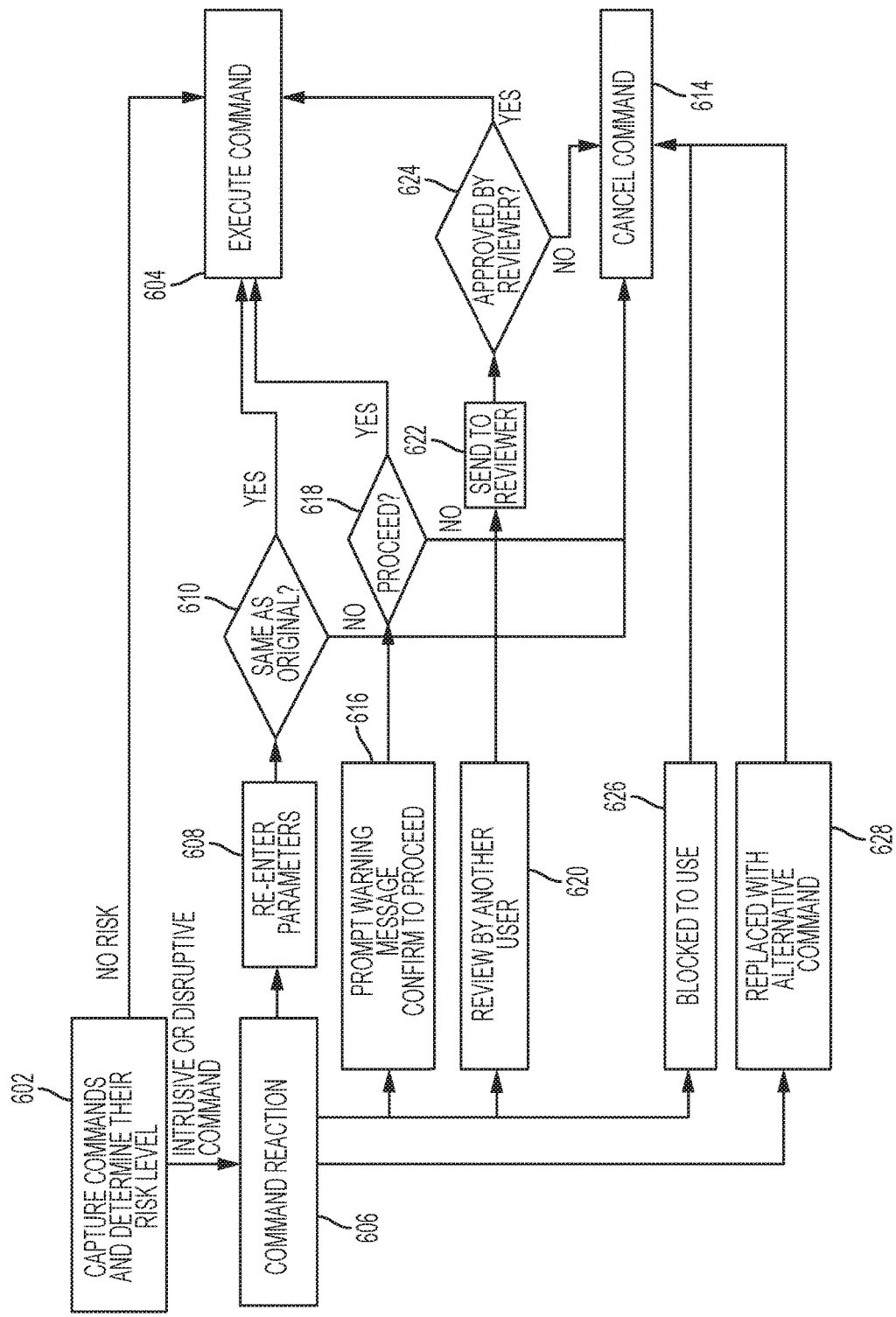
FIG. 6 is a flow diagram illustrating a method of determining a reaction in one embodiment of the present disclosure.

FIG. 6 is a flow diagram illustrating a method of determining a reaction in one embodiment of the present disclosure. At 602, a user entered command is captured and the risk level of the captured command is determined. If it is determined that there is no risk to executing the command, the command is executed at 604. For instance, the command is transmitted to a target computer or server where the command is to be executed, and for example, the transmission of the command causes the target server to execute the command.

If the captured command is determined to be an intrusive or disruptive command, for example, by comparing the command with a list of intrusive or disruptive commands defined for a target server, one or more command reactions may be activated at 606.

An example reaction at 608 may include requesting the user to re-enter one or more parameters of the command. The re-entered parameter may be received, e.g., via a user interface, e.g., via a display device, and at 610, it is determined whether the re-entered parameter is same as the originally entered parameters. If yes, the command is transmitted to a target server for execution at 604. This process verifies that the user meant to execute the command by reiterating the parameters.

If at 610, it is determined that the command is not the same as the original, the command is canceled at 614, and the user may be notified of the cancellation of the command.

At 616, a prompt warning message may be displayed for a confirmation to proceed, e.g., via a user interface, e.g., on a display device. A user may confirm or not confirm to proceed. The user input is received and based on the user input, it is determined whether to proceed at 618. If the user has confirmed to proceed, the logic of the method transmits the command to a target server for execution at 604. If the user confirmed not to proceed, the command is canceled at 614.

At 620, a request for another user to review the command may be activated and at 622, the command may be sent to another user, e.g., via communication techniques such as email, short message service (SMS) and/or any other communication technique. The reviewer's approval or disapproval may be received, and at 624, if the reviewer has approved the command, the method transmits the command to a target server for execution at 604. Otherwise, the command is canceled at 614.

At 626, the command reaction may be to block the use of the command. In this case, the command is canceled at 614. Another command reaction may be to replace the command with an alternative command at 628. For instance, based on the original command, alternative suggestions may be built. If so, the command is canceled at 614, to be replaced with another command.

The system and/or method of the present disclosure in one embodiment allows for local issuance of commands to a remote computer with reduced likelihood of errors, for example, that may cause system errors on the remote computer. A local terminal emulator, for example, running as an agent on a user device, may capture a user-issued command string prior to remote command invocation and dynamically construct risk enforcement policy based on server profile, task assignment, and/or command best practices. The local terminal emulator may parse and evaluate each captured command string against policies governing use of commands and present to the user the result of evaluation and enforcements actions. Examples of enforcements actions may include executing the command on remote computer as is, suggesting alternative commands, requiring additional user input, requesting validation and review before executing, and/or not executing the command on the remote computer.

In another aspect, data sent by the remote computer in response to keystrokes sent by a local terminal emulator may be intercepted. The intercepted data may be parsed. Each captured command string may be evaluated against policies governing use of commands. Messages that inform the user of the result of evaluation may be injected into the data sent by the remote computer to the terminal emulator.

A system in one embodiment may include one or more computers and a risk-control process that varies permissions to one or more users to execute one or more commands on a target computer, the permissions being varied according to a context. The system may be a rule-based system that analyzes the context and changes the permissions based on the context. An interrupter may interferes with the user access at a user input point, a level of interference being determined by the rule based system. The level of interference, for example, may be defined by users, and may include one or more of the following: a pop up display on a graphical user interface, a warning display or audio signal, a proposed alternative, access prevention, and/or others. A higher level of interference may include interaction with the user requiring user to input more information that can be validated by the system to reduce risk of unintentional action. The context may include one or more of the user, the description of the computer-executable task, the computer or server or another device being accessed, time of day, applications installed on the server, and/or critical resources on the server.

One or more client-side agents may control risks of remote server operations without modification to the server access application and without modification to the remote servers. A client-side agent may intercept user action, construct contextual control policy, and enforce the policy external to the server access application.

Figure 7:
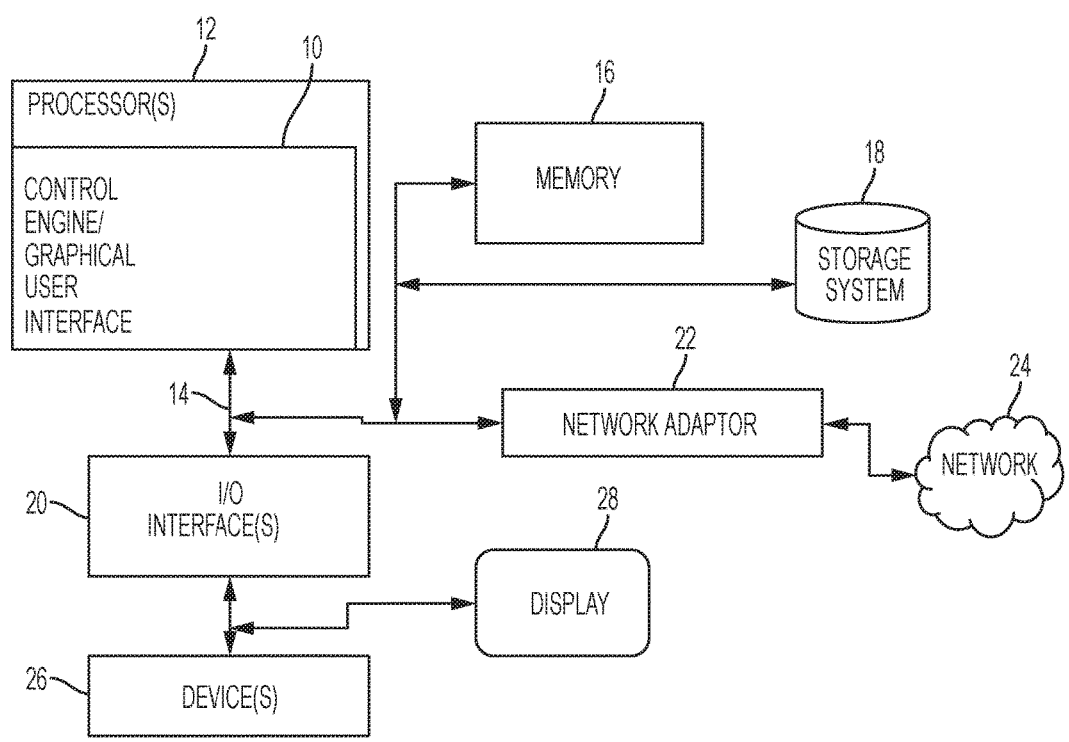
FIG. 7 illustrates a schematic of an example computer or processing system that may implement a command control and audit system in one embodiment of the present disclosure.

FIG. 7 illustrates a schematic of an example computer or processing system that may implement a command control and audit system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 7 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a control module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A computer-implemented method of controlling execution of computer-executable commands, the method performed by one or more hardware processors, comprising:
   intercepting, automatically by a computer-implemented agent process running on a first computer, a command issued from the first computer to execute on a target computer prior to invocation of the command on the target computer by at least capturing an application invocation signal and intercepting user input to the application;
   retrieving a server profile built for an application running on the target computer that supports the command;
   dynamically constructing a risk enforcement policy at least based on the server profile and change policy;

determining based on the risk enforcement policy, one or more computer-executable enforcement actions to perform prior to sending the command to the target computer for execution;

based on executing of one or more of the computer-executable enforcement actions, transmitting the command to execute on the target computer or preventing the command from executing on the target computer to prevent error; and storing information associated with the command comprising at least a source identifier that issued the command, a time the command was issued, and a reason the command was issued.

2. The method of claim 1, wherein the computer-executable enforcement actions comprise one or more of:
allowing the command to execute on the target computer;
presenting an alternative command to execute on the target computer;
requesting additional input associated with the command;
requesting validation and review before executing the command; or canceling executing of the command on the target computer.

3. The method of claim 1, wherein the first computer is a client-side computer.

4. The method of claim 1, wherein the target computer is a server computer.

5. The method of claim 1, wherein the risk enforcement policy comprises platform-specific user commands with different risk levels and device-specific resources.

6. A computer readable storage medium storing a program of instructions executable by a machine to perform a method of controlling execution of commands, the method comprising:

intercepting, automatically by a computer-implemented agent process running on a first computer, a command issued from the first computer to execute on a target computer prior to invocation of the command on the target computer by at least capturing an application invocation signal and intercepting user input to the application;

retrieving a server profile built for an application running on the target computer that supports the command;

dynamically constructing a risk enforcement policy at least based on the server profile and change policy;

determining based on the risk enforcement policy, one or more computer-executable enforcement actions to perform prior to sending the command to the target computer for execution;

based on executing of one or more of the computer-executable enforcement actions, transmitting the command to execute on the target computer or preventing the command from executing on the target computer to prevent error; and storing information associated with the command comprising at least a source identifier that issued the command, a time the command was issued, and a reason the command was issued.

7. The computer readable storage medium of claim 6, wherein the computer-executable enforcement actions comprise one or more of:
allowing the command to execute on the target computer;
presenting an alternative command to execute on the target computer;
requesting additional input associated with the command;
requesting validation and review before executing the command; or canceling executing of the command on the target computer.

8. The computer readable storage medium of claim 6, wherein the first computer is a client-side computer.

9. The computer readable storage medium of claim 6, wherein the target computer is a server computer.

10. The computer readable storage medium of claim 6, wherein the risk enforcement policy comprises platform-specific user commands with different risk levels and device-specific resources.

11. A system of controlling execution of commands, comprising:
one or more hardware processors,
one or more of the hardware processors operable to intercept a command issued from a first computer to execute on a target computer prior to invocation of the command on the target computer by at least capturing an application invocation signal and intercepting user input to the application,
one or more of the hardware processors further operable to retrieve a server profile built for an application running on the target computer that supports the command,
one or more of the hardware processors further operable to dynamically construct a risk enforcement policy at least based on the server profile and change policy,
one or more of the hardware processors further operable to determine based on the risk enforcement policy, one or more computer-executable enforcement actions to perform prior to sending the command to the target computer for execution,
based on executing of one or more of the computer-executable enforcement actions, one or more of the hardware processors further operable to transmit the command to execute on the target computer or prevent the command from executing on the target computer to prevent error;
a storage device operatively connected to one or more of the hardware processors, one or more of the hardware processors storing in the storage device, information associated with the command comprising at least a source identifier that issued the command, a time the command was issued, and a reason the command was issued.

12. The system of claim 11, wherein the computer-executable enforcement actions comprise one or more of:
allowing the command to execute on the target computer;
presenting an alternative command to execute on the target computer;
requesting additional input associated with the command;
requesting validation and review before executing the command; or canceling executing of the command on the target computer.

13. The system of claim 11, wherein the first computer comprises one or more of the hardware processors that perform the intercepting.

14. The system of claim 11, wherein the risk enforcement policy comprises platform-specific user commands with different risk levels and device-specific resources.

* * * * *